United States Patent [19]
Blaschek

[11] Patent Number: 5,225,860
[45] Date of Patent: Jul. 6, 1993

[54] FILM TRANSPORT FOR A MOTION PICTURE CAMERA

[75] Inventor: Otto Blaschek, Aschheim, Fed. Rep. of Germany

[73] Assignee: Arnold & Richter Cine technik GmbH & Co., Munich, Fed. Rep. of Germany

[21] Appl. No.: 684,893

[22] PCT Filed: Oct. 19, 1989

[86] PCT No.: PCT/DE89/00669
§ 371 Date: Apr. 19, 1991
§ 102(e) Date: Apr. 19, 1991

[87] PCT Pub. No.: WO90/04808
PCT Pub. Date: May 3, 1990

[30] Foreign Application Priority Data
Oct. 21, 1988 [DE] Fed. Rep. of Germany ....... 3835829

[51] Int. Cl.$^5$ .............................................. G03B 1/22
[52] U.S. Cl. ..................................... 352/192; 226/62; 226/67; 226/68; 226/70; 226/71
[58] Field of Search .................. 352/192, 193; 226/62, 226/64, 65, 67, 68, 70, 71, 72

[56] References Cited
U.S. PATENT DOCUMENTS

| 1,388,886 | 8/1921 | Pittman | 352/192 |
| 1,891,585 | 12/1932 | Vinten . | |
| 1,912,535 | 6/1933 | Mitchell | 226/68 |
| 4,402,581 | 9/1983 | Bauer | 352/192 |
| 4,896,960 | 1/1990 | Williamson | 352/193 |

FOREIGN PATENT DOCUMENTS

| 562569 | 10/1932 | Fed. Rep. of Germany | 226/62 |
| 634792 | 9/1936 | Fed. Rep. of Germany | 226/62 |
| 523383 | 4/1921 | France . | |

Primary Examiner—Monroe H. Hayes
Attorney, Agent, or Firm—Fish & Richardson

[57] ABSTRACT

Film transport for a motion picture camera with a claw 2, of which at least one claw tip 21, 22 advances the film to be transported, provided with perforations on one edge 10, stepwise past a gate, and a transport drive which comprises a working arm 5 connected with the middle segment 20 of claw 2 with articulation, said arm being connected by a claw crank pivot 12 with a crank arm 4 and moving claw 2 in such fashion that claw tips 21, 22 traverse an elongated closed curve which at one end enters the film plane and at the other end leaves it again, with crank arm 4 being coupled by a control arm 6 with a fixed bearing 14 of an oscillation crank 7, said crank being connected end segment 23 of claw 2 with articulation.

13 Claims, 5 Drawing Sheets

FILM TRANSPORT FOR A MOTION PICTURE CAMERA

The invention relates to a film transport mechanism for a motion picture camera.

DE-PS 36 43 594 teaches a film transport mechanism in a motion picture camera that moves the film, perforated along both edges, to be transported stepwise past a gate with the aid of transport claws in steps, said claws, together with the corresponding transport drive, being located on both sides of and symmetrically with respect to the central plane running vertically along the center of the film. The transport claws are moved by the respective transport drives in such manner that the tips of the claws traverse an elongated, closed curve which enters the film travel plane at one end and leaves it again at the other end.

For this purpose, each transport drive has two shafts, each coupled with a crank. The end of one crank forms a pivot at which the transport claw strap is articulated. In the middle portion of the transport claw strap there is likewise a pivot at which a connecting rod is articulated, said rod being connected with the end of the other crank. The two shafts connected with the cranks are connected by a rotating toothed pulley with a main drive shaft with the transport drives opposite one another being driven by the same common drive shaft which is mounted in one bearing on either side of the central plane.

In addition, a crank drive for a locking claw is provided, said drive being connected with the shaft driving the end of the transport claw strap. The angular displacement between the two cranks on the common shaft is selected so that the locking claw is outside the film plane when the transport claw tips are advancing the film.

One disadvantage of the known film transport mechanism consists in the fact that in order to change the advancing step and the angular relationships, in other words, the depth of penetration and path of the tips of transport claw, considerable design modifications are required and the length of the stroke is relatively large so that the film, as a result of engagement of the transport claw tips in the perforation holes, is moved along a curved path which results in a so-called "sawing action" produced by the sliding of the transport claw tips in the film perforations.

A claw transport is known from DE-PS 385 819, said transport consisting of two cranks, of which the first crank acts on one end of a rod with the claw pins, while the second crank is connected by an intermediate lever with the other end of the rod. Both cranks are coupled together by gears. In this known claw transport, considerable design modifications are required to change the depth of penetration and the path of movement of the claw tips in order to achieve a depth of penetration of the claw tips which is as small as possible yet sufficient depending on the local conditions.

The goal of the present invention is to improve a film transport according to the species in terms of its adaptability to local conditions.

The solution according to the invention provides a film transport mechanism which can be adapted simply to local conditions so that, with minor changes, different stepping and pulling angle relationships and a different stroke length are made possible and easy balancing of the transport is ensured, with limited space requirements in the vicinity of the film path being achieved as well.

The improved adaptability of the film transport mechanism to local conditions results in an extremely high resistance to wear and a low noise level of the film transport, making possible different step and angle relationships with minor conversion measures and avoiding balancing problems. In addition, a working curve for the claw is achieved which can be changed with minor technical means, the tips of said claw penetrating shallowly yet sufficiently into the film perforations and, at the end of the stroke, being pulled in the shortest possible time nearly perpendicularly out of the film perforations.

The film transport mechanism, limited mechanical means, permits different step and angle relationships, for example, advancing two, three, four, five, or six holes at a time and, optionally, a one-sided or two-sided drive, in which two film transports engage two rows of perforations in a film and transport said film.

This produces a film transport mechanism which is easy to adjust, in which only minor changes are required for adjustment to local conditions, whereby previously new claw systems had to be developed and built constantly. In the present film transport mechanism, by simply exchanging individual elements of the film transport mechanism, the magnitude of the stroke and the depth of penetration of the claw can be changed so that transport steps of different sizes can be implemented and the path of movement of the claw tips can be varied nearly at will.

One advantageous embodiment of the solution according to the invention is characterized by the fact that the control arm slides along a control curve by its end opposite the pivot. By using a control curve, there are more design possibilities for the movement of the claw so that nearly any path of movement of the claw tips is possible. However, one disadvantage of this arrangement is that the noise is greater.

Another embodiment of the solution according to the invention is characterized by the fact that the claw lever is extended beyond the fixed bearing and there is a pivot bearing at its end, said pivot bearing moving a locking claw pin, mounted perpendicularly to the film plane, back and forth by means of a claw lever and an additional pivot bearing.

Connecting the locking claw to the claw lever ensures that without any design changes in the control for the locking claw, its motion can be coordinated with the motion of the claw so that a change in the kinematics of the claw automatically results in a change in the movement of the locking claw.

Advantageous improvements on the invention will be described in greater detail below together with the description of the preferred embodiment of the invention with reference to the figures.

FIGS. 1 to 3 show schematically and in partially sectioned side views the construction of the film transport mechanism according to the invention for a motion picture camera for transporting a film 1.

Figure 1:
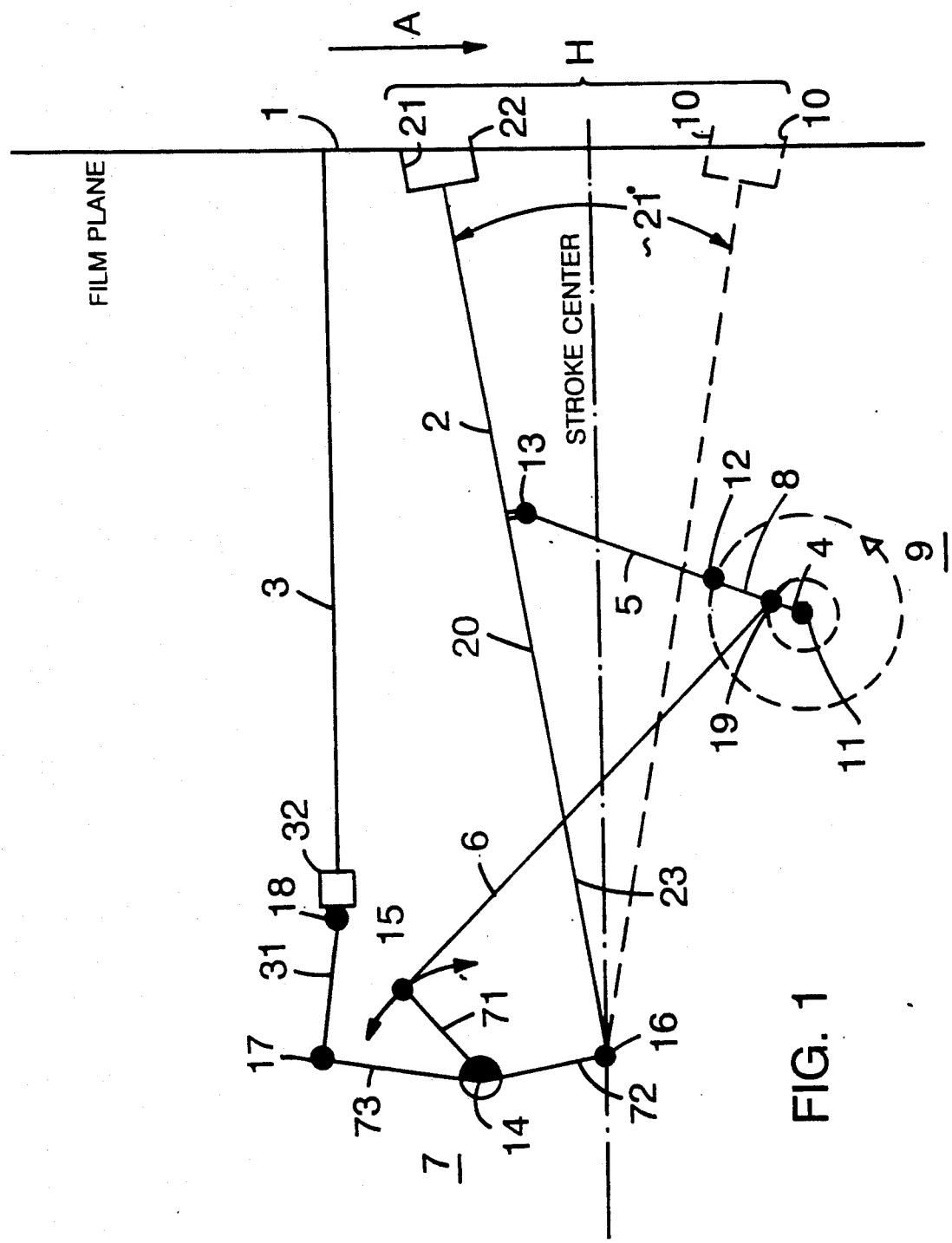
FIG. 1 is a schematic view of the individual elements of the film transport mechanism according to the invention.

The film transport mechanism has a claw 2 provided at one end with claw tips 21, 22, said tips engaging perforation holes 10 in film 1. The middle section 20 of claw 2 has a claw strap point 13 at which one end of a working arm 5 of a claw crank is articulated, the other end of said arm being connected with a claw crank pivot 12.

Claw crank pivot 12 is part of a working arm 8 which, together with a crank arm 4, is connected with a transport mechanism axis 9. Drive shaft 11 is connected by a coupling part with a drive motor, not shown in greater detail.

Crank arm 4 has a control crank pivot 19, to which one end of control arm 6 is articulated. Drive shaft 11, crank arm 4, and drive arm 8 are parts of transport axis structure 9 which additionally has a balancing segment 40 (FIGS. 4–6) which makes possible a dynamic balancing of the drive parts of the film transport mechanism in simple fashion.

The other end of control arm 6 is connected by a pivot 15 with an oscillating arm 71, which forms one lever of an oscillating crank 7. Oscillating crank 7 is mounted in a fixed bearing 14 and has a second lever in the form of a claw lever 72 as well as an extension 73, with the three levers 71, 72, 73 of oscillating crank 7 being in a fixed geometric relationship to one another.

The end of claw lever 72 forms a claw pivot 16, to which the end 23 of claw 2 which is opposite claw tips 21, 22 is articulated.

Extension 73 is connected with a pivot bearing 17 to which a locking claw lever 31 is articulated. Locking claw lever 31 is connected by a pivot bearing 18 with a locking claw strap 32, shrunk onto a locking claw pin 3, the leading flattened tip of said pin engaging perforation holes 10 in film 3 to hold the frame in place.

Figure 3:
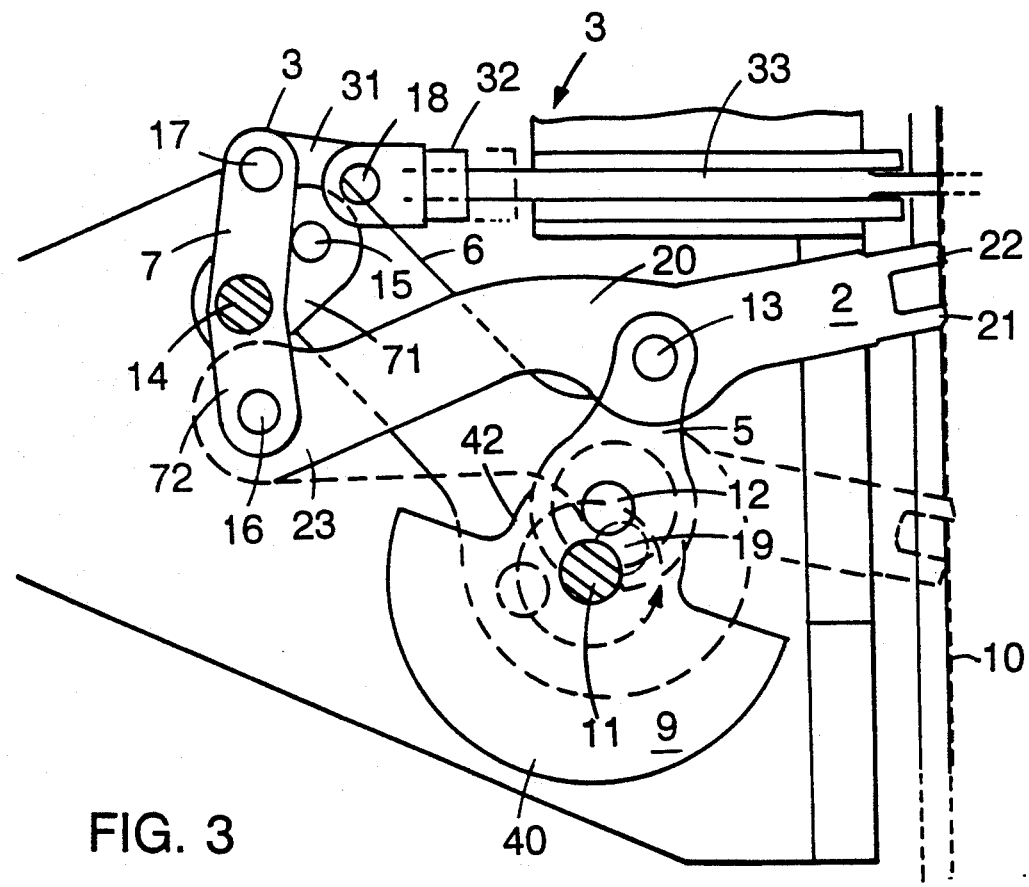
FIG. 3 is a side view, partially in cross section, of the film transport mechanism.

FIG. 3 shows in solid lines the beginning of the stroke of claw 2 as well as locking claw pin 3, which is disengaged from perforation holes 10 in film 1, while the dashed lines show the end of the stroke of claw 2 as well as locking claw pin 3, which is engaged in perforation holes 10. The transport direction of the film therefore runs in the direction of arrow A, while the claw stroke is shown by H in FIG. 1.

Figure 2:
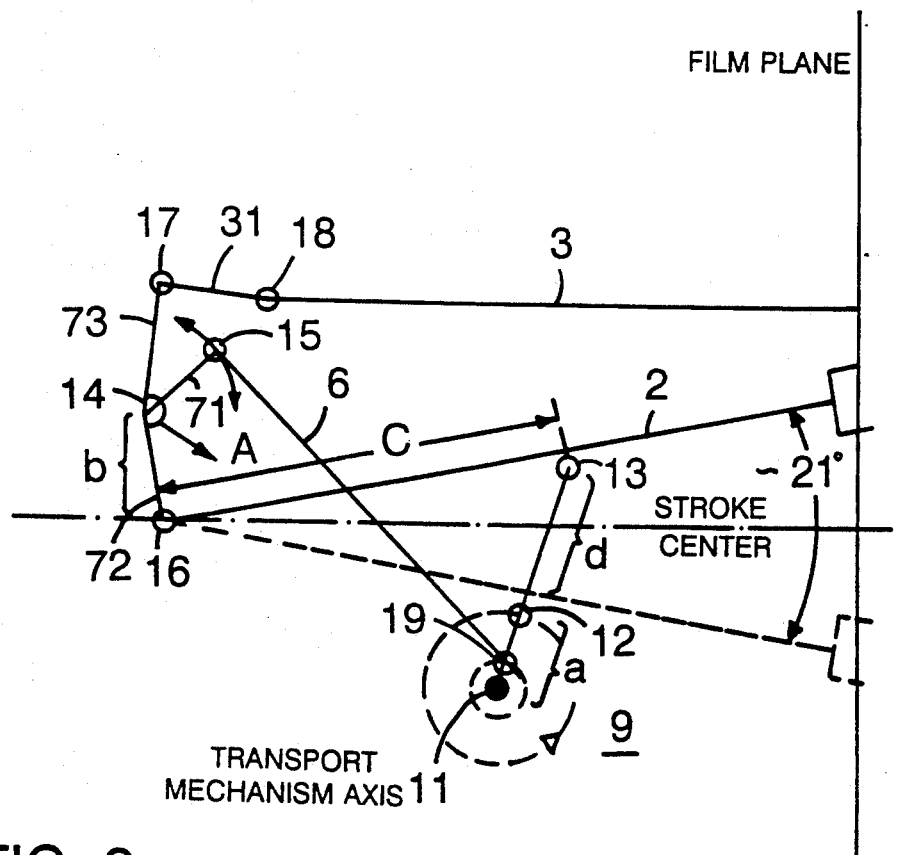
FIG. 2 is a view according to FIG. 1 explaining the variation of the dimensions of the individual elements in the film transport mechanism.

FIG. 2 shows the lever lengths and principal dimensions of the film transport mechanism in a schematic diagram.

Similarly to the representation in FIG. 1, drive shaft 11, control crank pivot 19, on which control arm 6 is articulated, claw crank pivot 12, on which working arm 5 is articulated, and claw strap point 13, to which working arm 5 is connected with middle section 20 of claw 2, lie on a line.

As shown in the drawing in FIG. 2, the claw passes through an angle of about 21° around the center of the stroke as it moves back and forth. To execute the stroke movement of the claw, control arm 6 executes a limited stroke, while, for example, as a consequence of the length of the leg of extension 73 of oscillating crank 7, a greater stroke is executed in the vicinity of pivot bearing 17, resulting in a correspondingly deep penetration of locking claw pin 3 into the perforation holes 10 of film 1.

One important advantage of the solution according to the invention consists in the fact that, on the one hand, by provision of a control arm 6, a limited stroke of this control arm 6 is sufficient to cause a large stroke of locking claw pin 3 and, on the other hand, as a result of minor change in the dimensions of the individual film transport elements or by a displacement of the pivot points, the depth of penetration and the stroke can be influenced. This simple influence on stroke and depth of penetration of the tips of locking claw pin 3 as well as claw tips 21, 22 is especially advantageous for equipping various motion picture cameras, since the individual requirements can be taken into account with simple means.

Thus, the film transport mechanism according to the invention can be easily converted to advance the film one, two, three, four, or five holes at a time, without a special film transport mechanism having to be designed for the purpose. Likewise, a straight or curved film path can be produced by setting the depth of penetration of the claw tips appropriately.

In addition, one-sided or two-sided mounting of the film transport for one-sided or two-sided transport of a film is possible. On important advantage of the solution according to the invention also consists in the fact that, by suitably displacing the film transport parts away from the film plane, sufficient space is created in the vicinity of the film plane to dispose there the additional elements of a motion picture camera.

According to FIG. 2, a uniform change in the length of stroke H can be achieved by changing the length a of drive arm 8. A unilateral change in the length of the stroke in the upper area of the stroke can be produced by changing dimension b of claw lever 72.

A unilateral change in the length of the stroke in the lower area is accomplished by changing dimension c of claw 2 between claw pivot 16 and claw strap point 13, as well as by shifting the center of the axis of oscillation crank 7 in the direction of the claw corresponding to arrow A.

The length of the stroke can be changed by varying dimension d of working arm 5.

All pivot points 12 to 19 in the film transport mechanism can optionally consist of ball bearings or sleeve bearings, whereby the former permit zero maintenance operation of the film transport mechanism while the latter provide an even lower noise level during operation, but require occasional maintenance especially in motion picture cameras with high transport speeds.

Another opportunity consists in using roller bearings characterized on the one hand by zero maintenance and on the other hand by lower operating noise than ball bearings. Therefore, depending on the application and purpose of the motion picture camera, suitable bearings for the pivot points can be provided, with no design changes in the film transport being required.

The side view in FIG. 3 of the film transport mechanism shows the geometric configuration of the individual transport elements and makes especially clear the construction of transport axis structure 9, oscillation crank 7, and claw 2.

Transport axis structure 9 carries claw crank pivot 12 as well as control crank pivot 19, to which working arm 5 and control arm 6 are articulated. In addition, transport axis structure 9 has a balancing segment 40 which serves for dynamic balancing of the film transport mechanism.

Oscillation crank 7 consists of claw lever 72 and extension 73 which form an obtuse angle between them, to which oscillating arm 71 is articulated in a fixed angular relationship. Oscillating crank 7 oscillates around fixed bearing 14, driven by control arm 6.

While the film is in the gate, locking claw pin 3 engages a perforation hole 10 in film 1 by its tip and during film transport is disengaged from perforation holes 10 in film 1. By rotating locking claw pin 3 through 180°, locking claw pin 3 can be simply adjusted.

Figure 4:
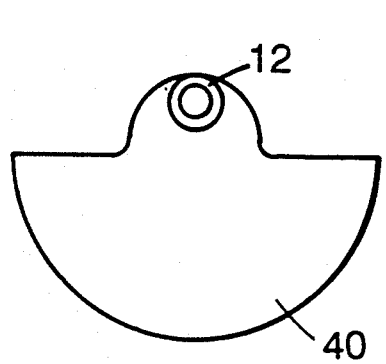
FIGS. 4 to 6 show various views of the transport axis structure.
Figure 5:
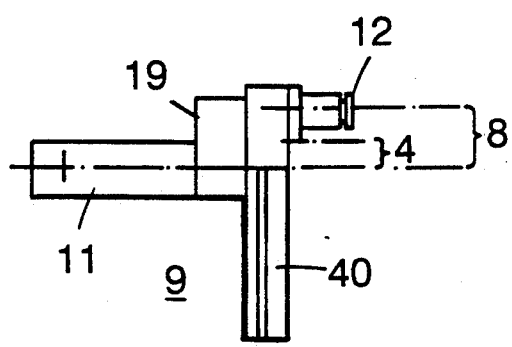
Figure 6:
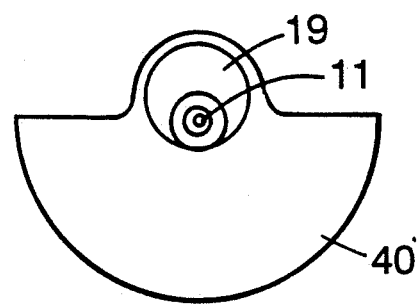

FIG. 4 shows a bottom view and FIG. 5 a side view and FIG. 6 a rear view of transport axis structure 9.

Transport axis structure 9 comprises drive shaft 11 connected with a drive motor, crank arm 4 with control crank pivot 19 for articulating control arm 6, balancing segment 40, and drive arm 8 with claw crank pivot 12 to articulate working arm 5. The transport axis structure is balanced by changing balancing segment 40, since both crank arm 4 and drive arm 8 are located on the same side of transport axis 9, so that dynamic balancing can be accomplished in simple fashion.

Figure 7:
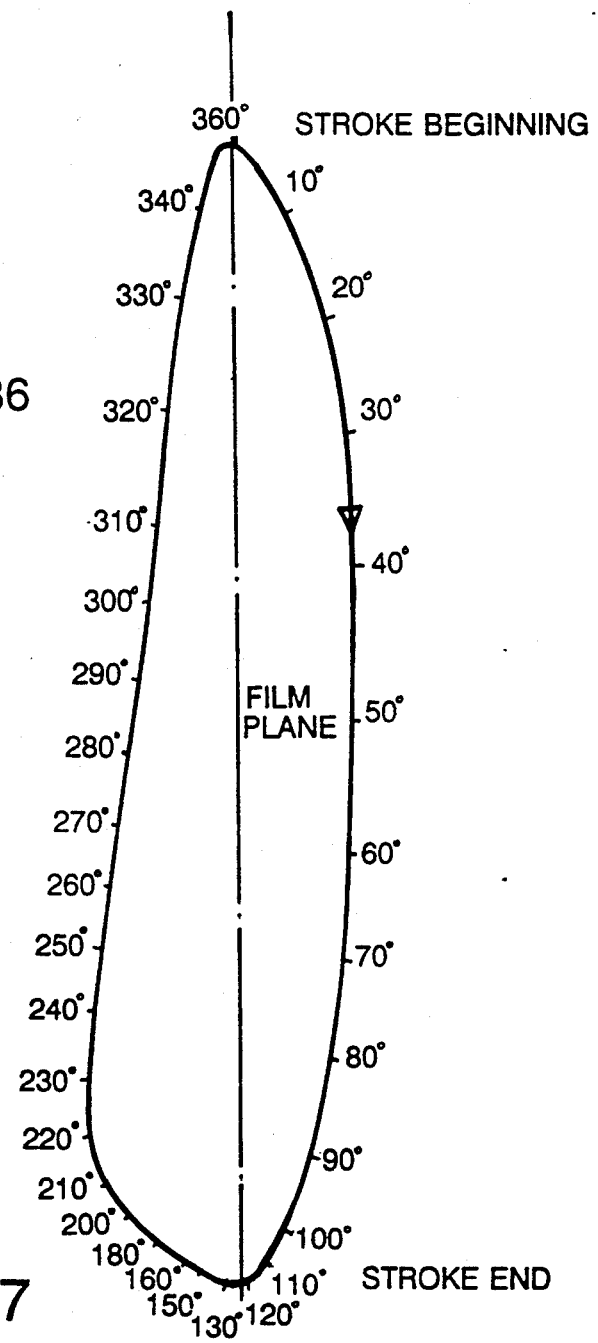
FIG. 7 is a graphic representation of the working curve of the claw.

FIG. 7 is a schematic diagram of the working curve of the transport claw relative to film plane 100 and shows the extremely shallow depth of penetration of the claw tips into the film perforations, so that, firstly, excessive stress on the film perforations is avoided and, secondly, the flat film path is not adversely affected.

The degrees entered in the schematic diagram of the claw working curve in FIG. 7 refer to the angle of rotation of crank arm 4, with the start of the stroke being set at 0° or 360°. The diagram in FIG. 7 is intended to show that crank arm 4 has passed through an angle of rotation of 120° from the start of the stroke to the end of the stroke, whereby this portion of the curve of the engagement of claw tips in the film perforations is characterized by a flat uniform path.

During the backward movement of the claw, the claw tips execute a movement shown to the left of the film plane, which extends over an angle of rotation from 120° to 360° of crank arm 4.

Figure 8:
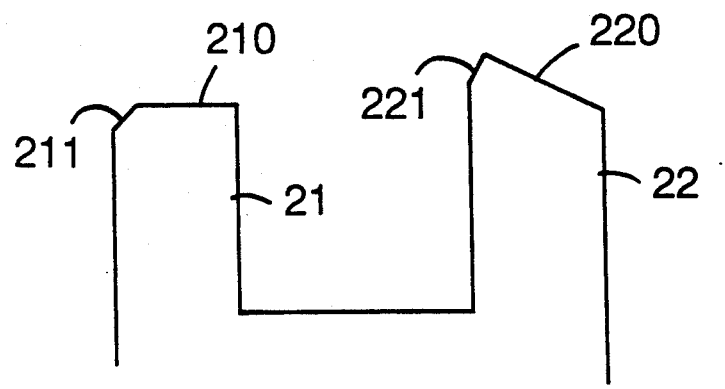
FIG. 8 is a detailed view of the claw tips.

FIG. 8 shows, enlarged, the shape of claw tips 21, 22, which are so designed that, firstly, gentle engagement in the film perforations is produced by alternate contact of the claw tips with the respective perforation edges in the film and, secondly, the film, during the movement of claw 2 during its stroke, can slide along claw tips 21, 22 and is therefore not forced to follow the limited stroke movement of claw 2.

Claw tip 21, which is forward in the direction of transport of the film, has a flattened leading edge 210 which is beveled at the top edge 211 in the direction of transport of the film.

Claw tip 22, which is at the rear in the direction of transport, on the other hand, has a sloping leading edge 220 which likewise is beveled at the top edge 221 in the direction of transport of the film.

Figure 9:
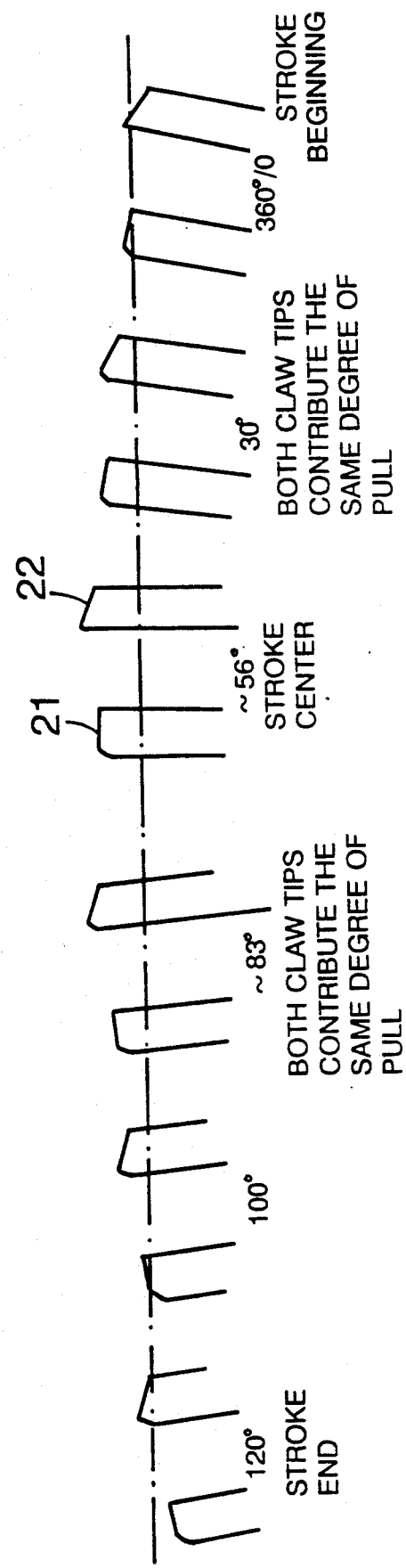
FIG. 9 is a sequence showing the engagement of the claw tips in the perforation holes of a film.

FIG. 9 illustrates the individual phases of movement of the claw tips upon engagement with the film perforations, whereby six stroke phases beginning with 0° and 360°, 30°, 56°, 83°, 100°, and 120° are shown.

At the start of the stroke (0° or 360°), the film is advanced exclusively as a result of claw tip 21, which is forward in the direction of transport, while claw tip 22, which is at the rear in the direction of transport of the film, engages the following perforation hole with play. With an angle of rotation of 30°, both claw tips 21 and 22 contribute the same degree of pull, since the leading edges of both claw tips 21 and 22 abut the leading edges of the successive perforation holes in the film. The same applies at the middle of the stroke, reached at about 56°.

With an angle of 83°, equal pull by claw tips 21, 22 is likewise ensured.

At an angle of 100°, only the leading edge of the rear claw tip 22 abuts the leading edge of the respective perforation hole, while claw tip 21, which is forward in the direction of transport of the film, is now disengaged from the respective hole.

At the end of the stroke (120°) only the beveled leading edge 221 of claw tip 22, which is at the rear in the direction of transport of the film, abuts the leading edge of the respective perforation hole in the film.

FIG. 9 shows that the special shape of the claw tips in combination with a limited depth of penetration of the claw tips into the film perforations ensures that the perforation holes slide along the claw tips during the stroke, so that the film is essentially held in the film plane and does not follow a curve.

To control control arm 6, instead of a crank arm 4, a curve control, for example, a cam disk, can be provided, with influence on the movement of the claw to influence the end points of the curve according to FIG. 7 is made possible. As a result, for example, the insertion movement caused by the control arm can be suspended at the end points, so that nearly any paths of movement of the claw tips can be achieved. In this manner, for example, straight and circular film paths are possible with the film transport according to the invention.

Figure 10:
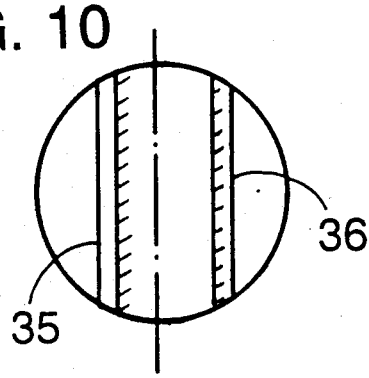
FIG. 10 is a top view of the locking claw tip.

FIG. 10 shows a top view of the tip of locking claw pin 3 whose adjusting surfaces 35 and 36 are staggered with respect to the center of locking claw pin 3 by a small amount so that, by rotating locking claw pin 3 through 180°, a different point of engagement of locking claw pin 3 is achieved. Adjusting surfaces 35 and 36 have a beveled area indicated by dashes to facilitate engagement of locking claw pin 3 in perforation holes 10 of film 1.

I claim:
1. A motion picture camera film transport mechanism for transport of perforated film along a film plane past gate structure comprising drive structure mounted for rotation about a fixed axis, oscillating structure mounted for oscillation about a bearing spaced from said fixed axis, claw arm structure for engaging a film perforation to advance the film stepwise through said gate structure of the motion picture camera said claw arm structure having a claw tip at one end and a claw pivot at its other end, a working arm coupled between said drive structure and said claw arm structure at a point intermediate said claw tip and said claw pivot for reciprocating said claw tip along a closed curved path to cause said claw tip to penetrate the film plane at one end of said path and leave it again at the other end of said path, said oscillating arm structure including first and second arm members, said claw pivot of said claw arm connected by said first arm member of said oscillating arm structure in articulated fashion, and control arm structure pivotally coupled at one end to said drive structure and at the other end to said second arm member of said oscillating arm structure.

2. Film transport mechanism of claim 1 and further including locking claw structure, and wherein said oscillating arm structure includes three arm members permanently connected to one another for pivoting movement about said bearing, and the third arm member is coupled to said locking claw structure for moving said locking claw structure perpendicularly to said film plane in back and forth motion.

3. Film transport mechanism of either claim 1 or 2 where said control arm structure is coupled to said drive structure for sliding movement along a control curve.

4. Film transport mechanism of either claim 1 or 2 and further including adjustment structure for adjusting the position of said bearing and the effective length of said working arm.

5. Film transport mechanism of either claim 1 or 2 wherein said drive shaft structure includes a balancing segment located between said claw pivot and said control arm pivot.

6. Film transport mechanism of either claim 1 or 2 wherein said bearings and pivots of said transport mechanism are ball bearings.

7. Film transport mechanism of either claim 1 or 2 wherein said claw arm has first and second claw tips located sequentially in the film transport direction, the leading edge of each said tip in the direction of film transport being beveled in such fashion that during each transport step, initially the leading edge of said first claw tip and then the leading edge of said second claw tip engages respective perforation edges of the film, and said leading edge of said first claw tip comes free of its corresponding perforation edge as soon as said leading edge of said second claw tip comes in contact with the perforation edge engaged by said second claw tip.

8. A motion picture camera film transport mechanism for transport of perforated film along a film plane past gate structure comprising drive structure mounted for rotation about a fixed axis.

oscillating structure mounted for oscillation about a bearing spaced from said fixed axis, said oscillating arm structure including first, second and third arm members permanently connected to one another for pivoting movement about said bearing, locking claw structure, claw arm structure for engaging a film perforation to advance the film stepwise through said gate structure of the motion picture camera said claw arm structure having a claw tip at one end and a claw pivot at its other end, a working arm coupled between said drive structure and said claw arm structure at a point intermediate said claw tip and said claw pivot for reciprocating said claw tip along a closed curved path to cause said claw tip to penetrate the film plane at one end of said path and leave it again at the other end of said path, said claw pivot of said claw arm connected by said first arm member of said oscillating arm structure in articulated fashion, and control arm structure pivotally coupled at one end to said drive structure for sliding movement along a control curve and at the other end to said second arm member of said oscillating arm structure, the third arm member coupled to said locking claw structure for moving said locking claw structure perpendicularly to said film plane in back and forth motion.

9. Film transport mechanism of claim 8 and further including adjustment structure for adjusting the position of said bearing and the effective length of said working arm.

10. A motion picture camera film transport mechanism for transport of perforated film along a film plane past gate structure comprising drive structure mounted for rotation about a fixed axis, oscillating structure mounted for oscillation about a bearing spaced from said fixed axis, said oscillating arm structure including first, second and third arm members permanently connected to one another for pivoting movement about said bearing, locking claw structure, claw arm structure for engaging a film perforation to advance the film stepwise through said gate structure of the motion picture camera said claw arm structure having a claw tip at one end and a claw pivot at its other end, a working arm coupled between said drive structure and said claw arm structure at a point intermediate said claw tip and said claw pivot for reciprocating said claw tip along a closed curved path to cause said claw tip to penetrate the film plane at one end of said path and leave it again at the other end of said path, said claw pivot of said claw arm connected by said first arm member of said oscillating arm structure in articulated fashion, control arm structure pivotally coupled at one end to said drive structure and at the other end to said second arm member of said oscillating arm structure, the third arm member coupled to said locking claw structure for moving said locking claw structure perpendicularly to said film plane in back and forth motion, and adjustment structure for adjusting the position of said bearing and the effective length of said working arm.

11. Film transport mechanism of either claim 8 or 10 wherein said drive shaft structure includes a balancing segment located between said claw pivot and said control arm pivot.

12. Film transport mechanism of either claim 8 or 10 wherein said bearings and pivots of said transport mechanism are ball bearings.

13. Film transport mechanism of either claim 8 or 10 wherein said claw arm has first and second claw tips located sequentially in the film transport direction, the leading edge of each said tip in the direction of film transport being beveled in such fashion that during each transport step, initially the leading edge of said first claw tip and then the leading edge of said second claw tip engages respective perforation edges of the film, and said leading edge of said first claw tip comes free of its corresponding perforation edge as soon as said leading edge of said second claw tip comes in contact with the perforation edge engaged by said second claw tip.

* * * * *

UNITED STATES PATENT AND TRADEMARK OFFICE
CERTIFICATE OF CORRECTION

PATENT NO. : 5,225,860

DATED : July 6, 1993

INVENTOR(S) : Otto Blaschek

It is certified that error appears in the above-identified patent and that said Letters Patent is hereby corrected as shown below:

Column 3, line 18, after "axis" insert -- structure --;

Column 3, line 43, delete "3" and insert therefor -- 1 --;

Column 4, line 8, delete "change" and insert therefor -- changes --;

Column 4, line 27, delete "On" and insert therefor -- One --;

Column 5, line 52, delete "leading" and insert therefor -- top --;

Column 5, line 56, delete "leading" and insert therefor -- top --; and

UNITED STATES PATENT AND TRADEMARK OFFICE
CERTIFICATE OF CORRECTION

PATENT NO. : 5,225,860
DATED : July 6, 1993
INVENTOR(S) : Otto Blaschek

It is certified that error appears in the above-indentified patent and that said Letters Patent is hereby corrected as shown below:

Column 5, line 57, delete "top" and insert therefor --leading--.

Signed and Sealed this

Nineteenth Day of April, 1994

Attest:

BRUCE LEHMAN

*Attesting Officer*       *Commissioner of Patents and Trademarks*